A. BRAZIER.
SAW.
APPLICATION FILED APR. 27, 1911.
1,076,815.
Patented Oct. 28, 1913.
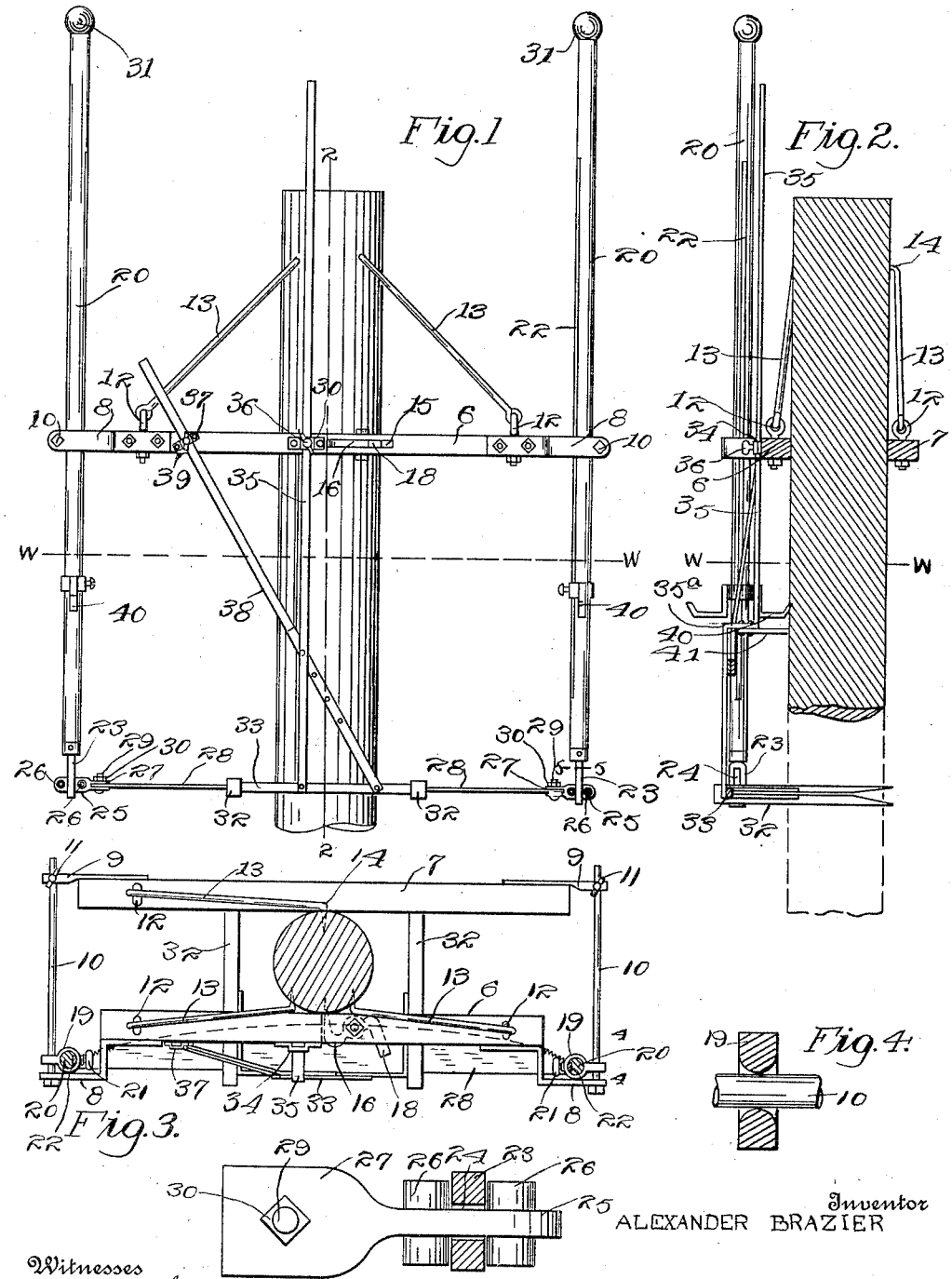
Inventor
ALEXANDER BRAZIER

UNITED STATES PATENT OFFICE.

ALEXANDER BRAZIER, OF OAKLAND, CALIFORNIA.

SAW.

1,076,815.  Specification of Letters Patent.  Patented Oct. 28, 1913.

Application filed April 27, 1911. Serial No. 623,701.

*To all whom it may concern:*

Be it known that I, ALEXANDER BRAZIER, a citizen of the United States, residing at Oakland, in the county of Alameda and State of California, have invented certain new and useful Improvements in Saws, of which the following is a specification.

This invention relates to sawing machines and the principal object of the same is to provide a sawing machine that can be used for cutting off piles below the water line and in which novel means are provided for suspending the machine from the pile so that the saw thereof can be freely reciprocated.

A preferred and practical embodiment of the invention is shown in the accompanying drawings, wherein:—

Figure 1 is a view in front elevation showing the sawing machine attached to a pile. Fig. 2 is a central vertical sectional view taken on the line 2—2, Fig. 1. Fig. 3 is a top plan view. Fig. 4 is an enlarged sectional view taken on the line 4—4, Fig. 3. Fig. 5 is an enlarged sectional view taken on the line 5—5, Fig. 1.

The improved sawing machine comprises the upper beams 6 and 7, beam 6 being the front and having angular end extensions 8. Beam 7 is at the rear and has end extensions 9. The end extensions 8 and 9 are connected by the adjusting bolts 10, set screws 11 being carried by end extensions 9 to lock the bolts 10 in their adjusted positions. Beams 6 and 7 are provided with eye bolts 12 to which the suspending arms 13 are swiveled, said arms having angular free ends 14 that are sharpened to permit them to be driven in the pile that is to be sawed. Beam 6 is provided with a central transverse seat 15 in which a dog 16 is pivotally mounted, said dog having one end sharpened for engaging the pile, and the other end 18 shaped to provide a handle for releasing the dog from said pile.

The adjusting bolts 10 have sleeves 19 pivotally mounted thereon, and saw operating rods 20 extend through said sleeves and are locked therein by the set screws 21. Said screws 21 engage wear strips 22 carried by said rods. The lower ends of rods 20 are provided with reduced extensions 23 that are provided with central longitudinal slots 24. Supporting arms 25 extend through slots 24 and carry rollers 26 that engage opposite surfaces of the extensions 23. The inner ends 27 of arms 25 are enlarged and bifurcated for the reception of the ends of a saw blade 28, bolts 29 and nuts 30 being employed for fastening the ends of said blade in said bifurcations. The upper ends of rods 20 carry weights 31 which facilitate the necessary rocking movements of said rods.

The saw blade 28 is slidable in a frame composed of the guiding arms 32 through which said blade extends and the angular bracket 33 that connects said arms. Beam 6 is provided with a guiding loop 34 through which a vertical supporting rod 35 extends, the lower end of said rod being fastened to the bracket 33. A set screw 36 is carried by loop 34 for adjustably locking rod 35 to beam 6. An inclined guiding loop 37 is carried by beams 6 and an inclined supporting rod 38 extends therethrough and has its lower end fastened to bracket 33. Rod 38 is adjustably locked to the beam 6 by the set screw 39 that is carried by loop 37.

Rods 20 below beams 6 and 7 have stirrups 40 adjustable thereon for the reception of the feet of the operators to assist in rocking said rods.

The supporting rod 35 is provided with a shouldered portion $35^a$ from which an abutment 41 projects and contacts with the work that is to be sawed to space the saw frame from said work.

When used in connection with piles forming parts of marine structures, the beams 6 and 7 are attached to the pile by the arms 13 and dog 16 above the water line, W—W as indicated in Figs. 1 and 2 and the rods 20, 35 and 38 are adjusted to place the saw 28 and saw frame at the desired distance below said water line. The beams 6 and 7 and the saw frame are stationary, and the saw is reciprocated across the pile by rocking the rods 20. Two operators may be employed to facilitate the sawing operation, one operator being at each rod 20.

What I claim as my invention is:—

A pile cutting device comprising a supporting bar, a rod adjustably connected with said bar, a saw guide carried by said rod, a diagonal rod connected with said guide and supporting bar for regulating the angle of said guide, a saw blade passing through said guide, and operating handles for said blade carried by said bar.

In testimony whereof I affix my signature in presence of two witnesses.

ALEXANDER BRAZIER.

Witnesses:
   Mrs. E. B. BRAZIER,
   H. C. SCHROEDER.

---

Copies of this patent may be obtained for five cents each, by addressing the "Commissioner of Patents, Washington, D. C."